(12) United States Patent
Yu et al.

(10) Patent No.: US 11,356,274 B2
(45) Date of Patent: Jun. 7, 2022

(54) VERIFYING A SET OF REMOTELY STORED DATA

(71) Applicant: Kaleidoscope Blockchain, Inc., Champaign, IL (US)

(72) Inventors: Mingchao Yu, Sydney (AU); Sreeram Kannan, Redmond, WA (US); Pramod Viswanath, Champaign, IL (US); Songze Li, Palo Alto, CA (US); Amir Salman Avestimehr, Rancho Palos Verdes, CA (US)

(73) Assignee: Kaleidoscope Blockchain, Inc., Champaign, IL (US)

( * ) Notice: Subject to any disclaimer, the term of this patent is extended or adjusted under 35 U.S.C. 154(b) by 367 days.

(21) Appl. No.: 16/696,950

(22) Filed: Nov. 26, 2019

(65) Prior Publication Data

US 2021/0091961 A1    Mar. 25, 2021

Related U.S. Application Data

(60) Provisional application No. 62/903,607, filed on Sep. 20, 2019.

(51) Int. Cl.
*H04L 29/06* (2006.01)
*H04L 9/32* (2006.01)

(52) U.S. Cl.
CPC .......... *H04L 9/3247* (2013.01); *H04L 9/3239* (2013.01)

(58) Field of Classification Search
CPC .............................. H04L 9/3247; H04L 9/3239
See application file for complete search history.

(56) References Cited

U.S. PATENT DOCUMENTS

| 4,309,569 | A  | * | 1/1982  | Merkle | H04L 9/3236 340/5.8 |
| 6,829,355 | B2 |   | 12/2004 | Lilly  | |
| 10,116,450 | B1 | * | 10/2018 | Brown  | H04L 9/3247 |
| 2007/0034687 | A1 | * | 2/2007  | Numao  | H04L 9/3247 235/380 |
| 2012/0110336 | A1 | * | 5/2012  | Frey   | G06F 12/1408 713/181 |
| 2018/0075253 | A1 | * | 3/2018  | Auh    | G06F 16/258 |

(Continued)

OTHER PUBLICATIONS

Al-Bassam et al., Fraud and Data Availability Proofs: Maximising Light Client Security and Scaling Blockchains with Dishonest Majorities, May 25, 2019.

(Continued)

*Primary Examiner* — Ghodrat Jamshidi
(74) *Attorney, Agent, or Firm* — Van Pelt, Yi & James LLP

(57) ABSTRACT

Verifying a set of remotely stored data is disclosed, including: requesting a first element corresponding to a first leaf in a base layer of a digital tree, wherein the digital tree corresponds to a set of remotely stored data; receiving the first element corresponding to the first leaf; and receiving a membership proof comprising a set of elements from one or more layers higher in the digital tree than the base layer of the digital tree, wherein the set of elements comprises a path from the first leaf to a root of the digital tree, wherein the set of elements is dependent on a plurality of additional leaves and wherein verification of the first element corresponding to the first leaf increases a level of confidence in an availability of the plurality of additional leaves.

18 Claims, 12 Drawing Sheets

(56) References Cited

U.S. PATENT DOCUMENTS

| | | | | |
|---|---|---|---|---|
| 2018/0181756 A1* | 6/2018 | Campagna | ............ | H04L 9/0877 |
| 2019/0339668 A1* | 11/2019 | Biernat | ................ | H04L 9/3239 |
| 2020/0201964 A1* | 6/2020 | Nandakumar | .......... | G06F 21/64 |
| 2020/0344042 A1* | 10/2020 | Hwang | ................ | H04L 9/0643 |
| 2021/0279354 A1* | 9/2021 | Gandhi | ............... | G06F 16/2282 |
| 2021/0304201 A1* | 9/2021 | Li | ........................ | G06Q 20/401 |

OTHER PUBLICATIONS

Bagaria et al., Deconstructing the Blockchain to Approach Physical Limits, Nov. 8, 2018.
Lin et al., Error Control Coding, 2004.

\* cited by examiner

VERIFYING A SET OF REMOTELY STORED DATA

CROSS REFERENCE TO OTHER APPLICATIONS

This application claims priority to U.S. Provisional Patent Application No. 62/903,607 entitled VERIFYING A SET OF REMOTELY STORED DATA filed Sep. 20, 2019 which is incorporated herein by reference for all purposes.

BACKGROUND OF THE INVENTION

In situations in which a first party needs to check whether a second party possesses an entire data entity, the first party typically needs to download the whole data entity from that second party. In particular, where the first party is remote from the second party, it may be resource intensive and also inefficient to transfer the entire data entity from the second party to the first party. It would be desirable for the first party to verify that the second party has the entire data entity without having to download the entire data entity from the second party.

BRIEF DESCRIPTION OF THE DRAWINGS

Various embodiments of the invention are disclosed in the following detailed description and the accompanying drawings.

DETAILED DESCRIPTION

Figure 1:
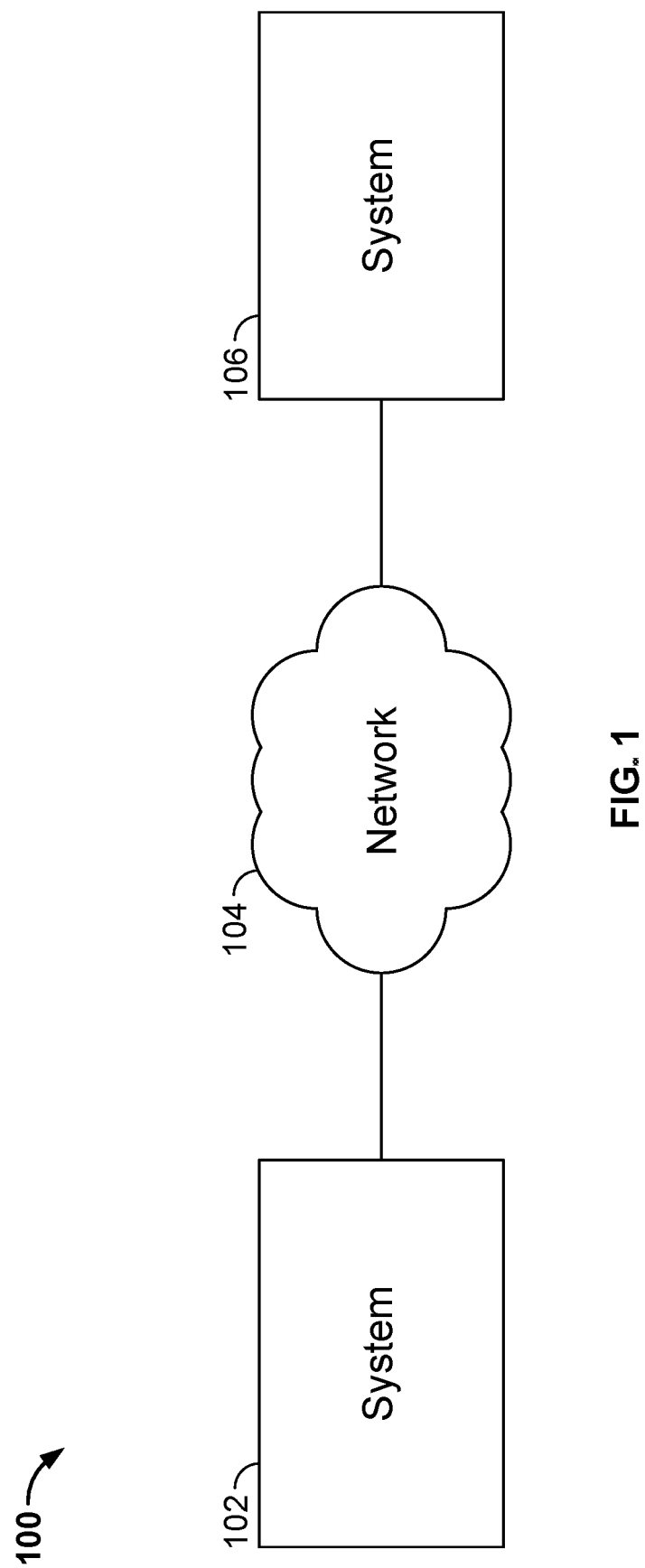
FIG. 1 is a diagram showing an embodiment of a system for verifying a set of remotely stored data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Cryptographic digital signature has been widely adopted for digital information authentication. A digital signature is a digital description of a data entity that is generated using a one-way function, such that it is easy to generate the digital signature given the data entity, but it is extremely difficult to guess the data entity given the digital signature, or to find another data entity that has the same digital signature. This way, any party who possesses the authentic digital signature of a data entity can authenticate a data entity by computing the digital signature of this data entity and comparing it with the authentic digital signature. Some example one-way functions that can be used to generate digital signatures are secure hash algorithms (SHA).

To further enable the authentication of a subset of a data entity without downloading the entire data entity, digital signature accumulators have been developed. These methods commonly partition the data entity into portions, compute the digital signature of each portion, and then iteratively batch digital signatures and compute the digital signature of each batch, until the final digital signature is reasonably small. This yields a tree of digital signatures, where the portions at the base layer are called the leaves and the final digital signature is called the root. For a party who possesses the authentic final digital signature of a data entity to authenticate a portion of this data entity, it only needs to download all the sibling digital signatures along the path between this portion and the final digital signature in the tree. An example of a digital signature accumulator is the Merkle tree.

However, these methods are not able to address the following challenge: If one party claims to possess a data entity entirely, how could another party who only possesses the authentic digital signature of this data entity verify this claim without downloading the entire data entity from the claiming party? This challenge could rise if the claiming party is trustless and the verifying party is not able to download the entire data entity, e.g., due to limited resources.

This challenge is hard to address because without downloading the entire data entity from the claiming party, the best approach for the verifying party is to randomly sample portions of the data entity from the claiming party to check whether any portion is missing. However, if the claiming party is only missing a very small portion of the data entity, the probability of using random sampling to successfully detect that the claiming party is in fact missing the portion of the data entity is low.

Embodiments of verifying a set of remotely stored data are described herein. In various embodiments, a cryptographic digital signature of a data entity is generated, so that any party who possesses this signature can verify whether another party has this data entity entirely or not, without downloading the whole data entity from this party.

As mentioned above, in various embodiments, a digital signature of a data entity is generated such that any party who possesses this digital signature can verify, at a very high confidence level, another party's claim on possessing the data entity in its entirety through sampling a small amount of data from this claiming party. In some embodiments, such a digital signature is generated using a tree-structured digital signature accumulator where every layer of the tree is redundancy encoded.

FIG. 1 is a diagram showing an embodiment of a system for verifying a set of remotely stored data. Environment 100 includes at least system 102, network 104, and system 106. For example, system 102 and system 106 are remote to each other because they are not physically close to one another. System 102 is able to communicate with system 106 over network 104. Network 104 may be a high-speed data and/or telecommunications network. Either system 102 or system 106 may store sets of data (e.g., data entities) that other systems may desire or at least verify that either system 102 or system 106 does in fact possess such sets of data in their entirety. In a first example, a light (resource restricted) node in a blockchain system would like to verify whether another node fully possesses a newly generated transaction block or not, without downloading the block. In a second example, a stakeholder of a public company would like to verify whether a third-party auditing firm's node has fully received the annual financial report of the public company or not, without downloading the report. In various embodiments, a system that stores a data entity also generates and stores a digital tree (sometimes also referred to as a "digital signature tree") corresponding to the data entity. As will be described in further detail below, a digital tree corresponding to the data entity is generated including by: applying a (e.g., redundancy) code to various portions of the data entity to generate parity information, generating digital signatures corresponding to the portions of the data entity and the parity information, and batching the digital signatures into groups to form a higher layer of the digital tree. In some embodiments, non-adjacent digital signatures are included in the same groups during the batching process. The (e.g., redundancy) code is again applied to the groups of digital signatures to generate parity information, new digital signatures corresponding to the groups and the parity information are generated, and the new digital signatures are batched into groups to form a next, higher layer of the digital tree. The process repeats until only a threshold number of groups (e.g., one) can be generated from batching together digital signatures in a layer. Then, in some embodiments, a digital signature is optionally generated based on the last group of digital signatures and the final digital signature is not only the root/highest layer of the digital tree, but the final digital signature is also sometimes referred to as the "digital signature of the data entity."

For example, system 106 may claim to possess Data Entity A in its entirety and system 102 would like to purchase a copy of Data Entity A from system 106. Before system 102 wants to send money to system 106 to purchase a copy of Data Entity A, system 102 wants to verify that system 106 does in fact have Data Entity A in its entirety. In various embodiments, for a verifying system, system 102, to verify whether another (remote) claiming system, system 106, possesses Data Entity A in its entirety, system 102 needs to obtain the authentic digital signature of Data Entity A, and request from system 106 a series of portions (which are sometimes referred to herein as "elements") from the digital tree corresponding to Data Entity A as well as membership proofs corresponding to the requested digital tree elements. For example, system 102 may obtain the authentic digital signature of Data Entity A from system 106 or another system. In various embodiments, system 102 can use the digital signature of Data Entity A and a corresponding membership proof associated with each requested element to verify whether that element is part of the digital tree committed by the digital signature. Given that each layer of the digital tree corresponding to Data Entity A is coded using a (e.g., redundancy) code, the unavailability of a small portion of the data at each layer will make a large portion of the parity information of this layer unavailable. Non-adjacent digital signatures of each layer are batched together to form the next layer of the digital tree and thus, each layer of the digital tree is dependent upon the one or more lower layers of the digital tree. As such, as each subsequent element that is sampled/requested from Data Entity A's digital tree is verified by system 102, system 102's confidence level that system 106 possesses the entirety of Data Entity A increases exponentially. If system 102 uses a configured verification confidence level threshold that is less than 100% but nevertheless a high percentage, then system 102 can reach that threshold by sampling only a (generally, small) subset of the digital tree that is stored by system 106. As a result, system 102 can determine whether a claiming system such as system 106 possesses a data entity at a high confidence level by sampling/downloading far less data than is conventionally needed. Sampling less data by system 102 from system 106 means that less data needs to be transmitted over network 104, which saves time and also network resources. Conventionally, nearly all of a data entity needs to be requested/sampled from the claiming party in order to verify that the claiming party has the entire data entity at a high confidence level.

As will also be described in further detail below, in various embodiments, a verifying system, system 102, can also verify whether sampled elements of a digital tree corresponding to Data Entity A indicate that the encoding in the digital tree has been performed correctly. Incorrectness in the encoding of the digital tree also indicates a negative conclusion, including, for example, that the system/party (e.g., a system other than claiming party system 106) that had generated the digital signature of Data Entity A is engaging in fraudulent activity and that therefore, Data Entity A is fraudulent and must be permanently rejected regardless of whether it is available or not. If a claiming party, such as system 106, claims that Data Entity A is available (which implies that it admits that Data Entity A is valid), then this claiming party is suspicious of engaging in fraudulent activity as well.

Figure 2:
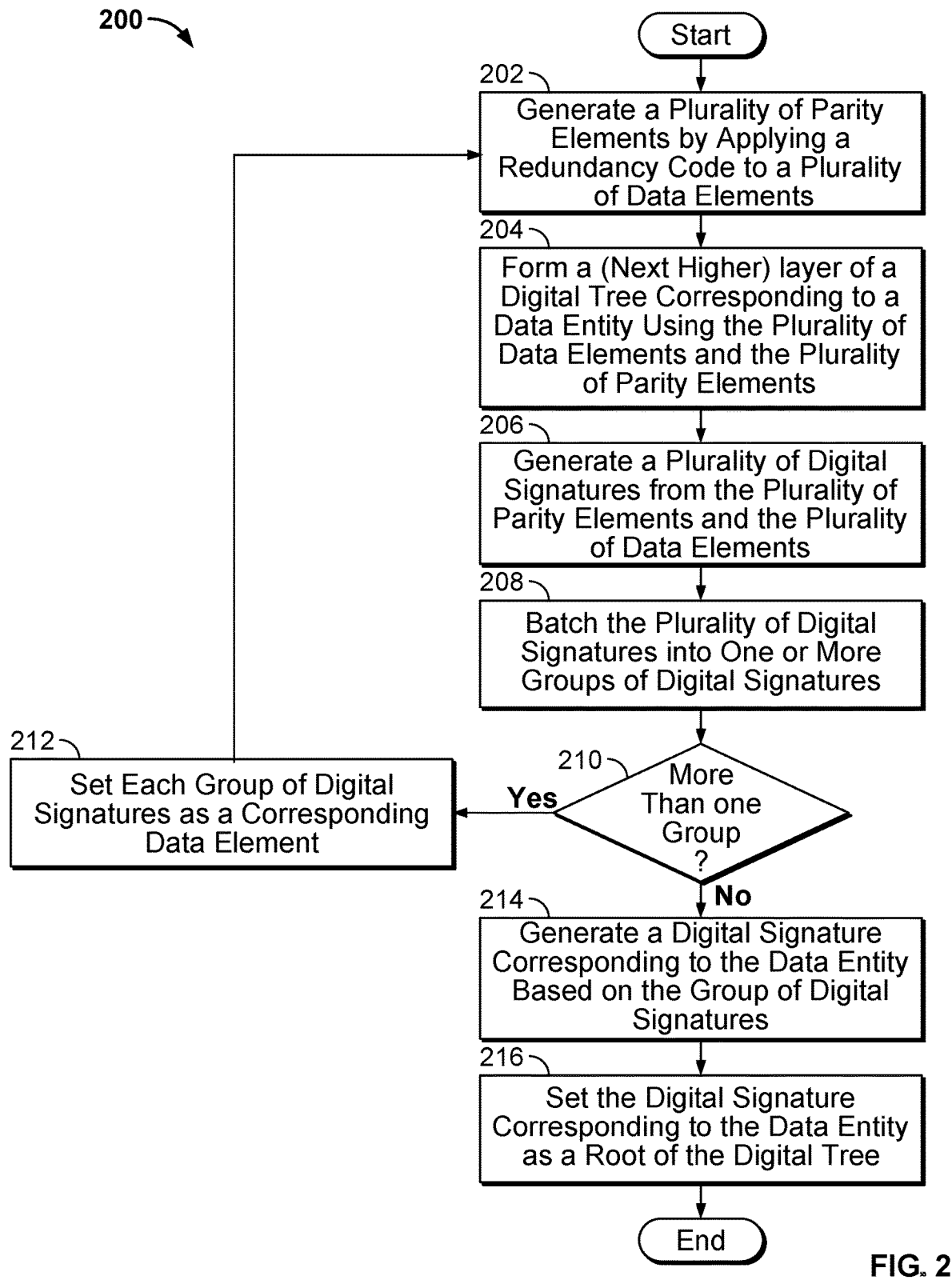
FIG. 2 is a flow diagram showing an embodiment of a process for generating a digital tree corresponding to a data entity.

FIG. 2 is a flow diagram showing an embodiment of a process for generating a digital tree corresponding to a data entity. In some embodiments, process 200 is implemented at system 102 or system 106 of FIG. 1.

At 202, a plurality of parity elements is generated by applying a redundancy code to a plurality of data elements. In the first instance of performing step 202 for a data entity, the data entity is divided into partitions and each partition is set to be a data element of the digital tree corresponding to the data entity. In instances of performing step 202 other than the first time, a data element is a group of digital signatures from the immediately lower layer in the digital tree.

One or more parity elements are generated from applying a redundancy code to the data elements.

An (N, K) redundancy code is a function that generates $N \geq K$ coded symbols using K data symbols (which are sometimes referred to as "elements"). The ratio $r=K/N$ is called the "coding rate." A redundancy code generally allows the K data symbols to be correctly decoded if the number of erased or erroneous coded symbols is reasonably small. A redundancy code is systematic if the K data symbols are included in the N coded symbols. In this case, the remaining N–K symbols are conventionally called "parity symbols" (which are sometimes referred to as parity "elements"). For example, the N–K parity elements are appended to the K data elements. In some embodiments, different values of N and K of the (N, K) redundancy code are applied to each layer of the digital tree due to the batching of elements from the immediately lower layer, as will be described in further detail below.

At 204, a (next higher) layer of a digital tree corresponding to a data entity is formed using the plurality of data elements and the plurality of parity elements. After step 204 is performed for the first instance for a data entity, the base layer of the digital tree is formed using the partitions of the original data entity (data elements) and the parity elements that were generated using the partitions of the original data entity. After step 204 is performed for an instance for the data entity other than the first, a new, non-base layer of the digital tree is formed using groups of digital signatures corresponding to data elements and parity elements from the immediately lower layer of the digital tree.

At 206, a plurality of digital signatures is generated from the plurality of parity elements and the plurality of data elements. A digital signature is generated from each of the data elements and each of the parity elements of the new layer. For example, a digital signature is generated from a data or parity element by applying a one-way hash function to the element. An example one-way hash function is an SHA.

At 208, the plurality of digital signatures is batched into one or more groups of digital signatures. Combinations of digital signatures of non-adjacent, if possible, data and parity elements from the new layer are batched to form groups of digital signatures.

At 210, whether there is more than one group of digital signatures is determined. In the event that there is more than one group of digital signatures, control is transferred to 212. Otherwise, in the event that there are no more groups of digital signatures, control is transferred to 214.

At 212, each group of digital signatures is set as a corresponding data element. In some embodiments, if there was more than one group of digital signatures, step 202 would be returned to, to apply the redundancy code to the groups of digital signatures by considering each group of digital signature as a data element of the next higher layer of the digital tree.

At 214, a digital signature corresponding to the data entity is generated based on the group of digital signatures. In some embodiments, if there was only one group of digital signatures, then a digital signature that is generated from that group (e.g., using an SHA function) is considered to be the digital signature corresponding to the data entity.

At 216, the digital signature corresponding to the digital entity is set as a root of the digital tree. The digital signature corresponding to the data entity is also set as the root/highest layer of the digital tree corresponding to the data entity.

Figure 3:
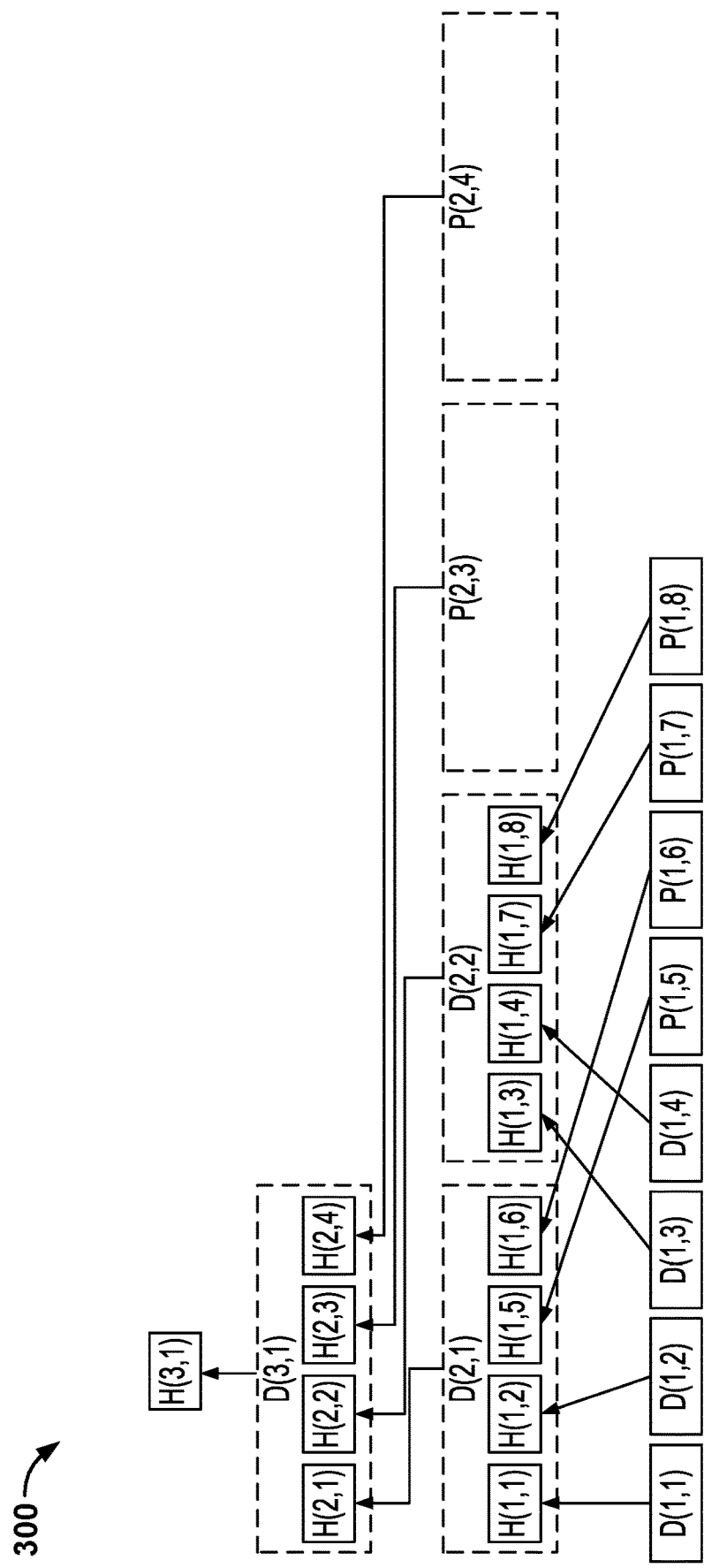
FIG. 3 demonstrates an example of generating a digital signature of a data entity in accordance with some embodiments.

FIG. 3 demonstrates an example of generating a digital signature of a data entity in accordance with some embodiments.

1. A data entity is evenly partitioned into 4 data symbols D(1,1), D(1,2), D(1,3), and D(1,4).
2. A (8,4) redundancy code is applied to these 4 data symbols to generate 4 parity symbols P(1,5), P(1,6), P(1,7), and P(1,8). As shown in the example of FIG. 3, the base layer of digital tree 300 is formed by the 4 data symbols D(1,1), D(1,2), D(1,3), and D(1,4) of the original data entity and the corresponding 4 parity symbols P(1,5), P(1,6), P(1,7), and P(1,8).
3. A one-way function h( ) is applied to the above 8 symbols to compute their digital signatures, H(1,1), H(1,2), H(1,3), H(1,4), H(1,5), H(1,6), H(1,7), H(1,8).
4. 4 digital signatures H(1,1), H(1,2), H(1,5), H(1,6) are batched into a data symbol D(2,1). The other 4 digital signatures H(1,3), H(1,4), H(1,7), H(1,8) are batched into another data symbol D(2,2).
5. A (4,2) redundancy code is applied to these 2 data symbols to generate 2 parity symbols P(2,3) and P(2,4).
6. A one-way function h( ) is applied to the above 4 symbols to compute their digital signatures H(2,1), H(2,2), H(2,3), H(2,4).
7. H(2,1), H(2,2), H(2,3), H(2,4) are batched into one data symbol D(3,1).
8. A one-way function h( ) is applied to D(3,1) to compute its digital signature H(3,1).

The result is digital tree 300, where every layer is redundancy encoded. As shown in FIG. 3, the top digital signature, H(3,1), which is the root/highest layer of digital tree 300, is the digital signature of the data entity.

Figure 4:
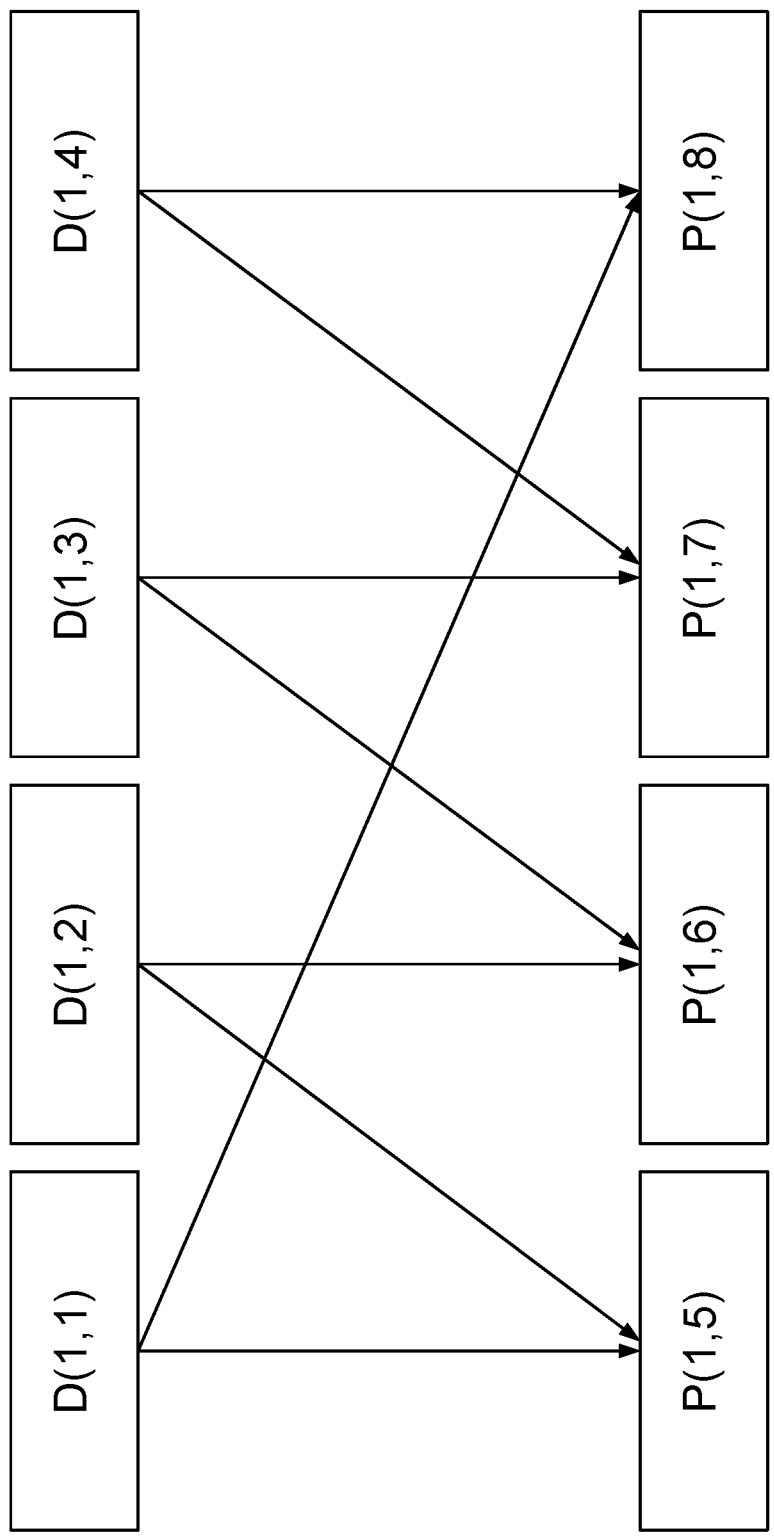
FIG. 4 demonstrates the encoding of a set of 4 data symbols (D(1,1), D(1,2), D(1,3), D(1,4)) using an (8,4) systematic redundancy code.

FIG. 4 demonstrates the encoding of a set of 4 data symbols (D(1,1), D(1,2), D(1,3), D(1,4)) using an (8,4) systematic redundancy code. Each of the 4 parity symbols is the binary XOR of 2 data symbols. For example, P(1,5) is the binary XOR ($\oplus$) of D(1,1) and D(1,2), so that D(1,1) $\oplus$D(1,2) $\oplus$P(1,5)=0, which is a parity equation. In general, a "parity equation" includes at least two coded symbols that sum up to zero using predefined coefficients chosen from a binary field or a larger field. For example, a parity equation may be a linear combination. When a systematic redundancy code is applied, among the coded symbols, at least one symbol must be a parity symbol. The number d of coded symbols in a parity equation is called the "parity equation size." In some embodiments, an ensemble of low-density-parity-check (LDPC) codes is used, such that by applying it to the data symbols of a layer, 1) there will be parity equations with a small size d upper bounded by a constant, and 2) any $\alpha$ percent ($\alpha \leq r$ is a constant, and r is the coding rate) of the coded symbols allows the decoding of all the data symbols of this layer.

Figure 5:
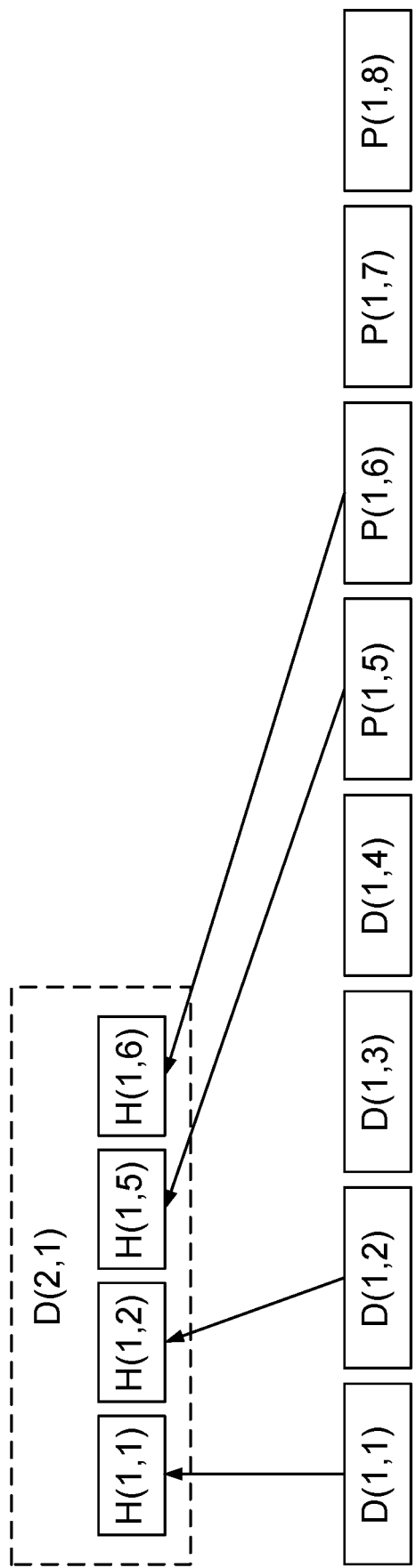
FIG. 5 demonstrates an interleaved batching technique applied in accordance with some embodiments.

FIG. 5 demonstrates an interleaved batching technique applied in accordance with some embodiments. After applying an (8,4) systematic redundancy code, whose coding rate is r=0.5, the digital signatures of every q=4 coded symbols are batched together to form one data symbol of the higher layer. q is chosen in a way that qr>1, so that the size of the layer reduces with height. In some embodiments, the digital signatures batched together include a combination of interleaved (e.g., non-adjacent) symbols of the next (lower) layer. As shown in FIG. 5, a combination of the digital signatures of interleaved data symbols and parity symbols (leaves) of a bottom/base layer of a digital signature tree is batched to form a data symbol in the next, higher layer of the digital signature tree. Because the data and parity symbols of one layer are batched together to form a symbol in the next higher layer, the symbols of one layer in the digital signature tree can be said to be dependent on the symbols in the layer below. For example, the data symbol D(2,1) of the second layer consists of the digital signatures of D(1,1), D(1,2), P(1,5) and P(1,6) of the first layer. In some embodiments, each batch includes the digital signatures of qr data symbols and the digital signatures of q(1−r) parity symbols.

Figure 6:
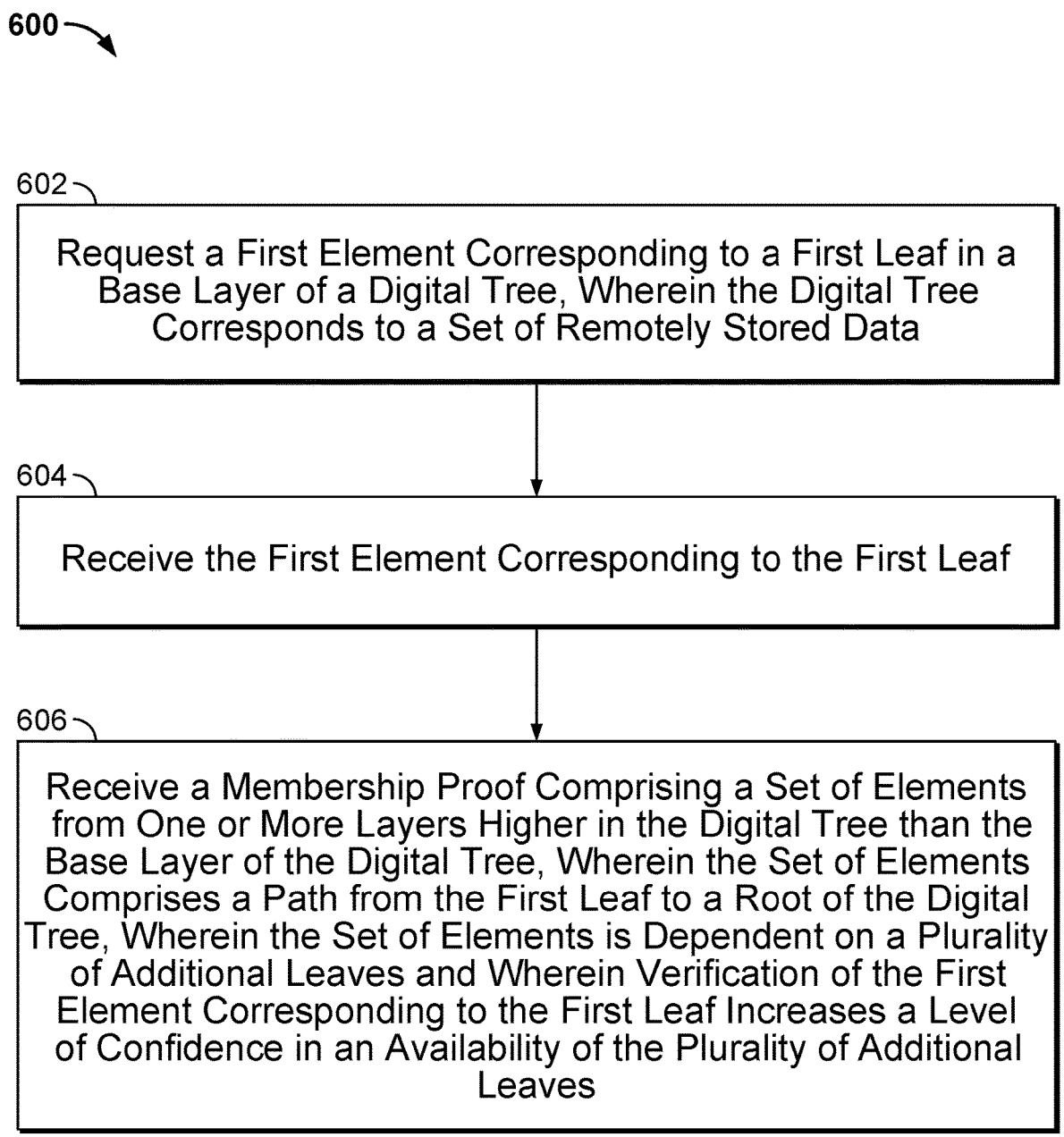
FIG. 6 is a flow diagram showing an embodiment of a process for verifying a set of remotely stored data.

FIG. 6 is a flow diagram showing an embodiment of a process for verifying a set of remotely stored data. In some embodiments, process 600 is implemented at system 102 or system 106 of FIG. 1.

At 602, a first element corresponding to a first leaf in a base layer of a digital tree is requested, wherein the digital tree corresponds to a set of remotely stored data. A data element or a parity element corresponding to a leaf in a base layer of a digital tree corresponding to a data entity is requested from a system that claims to possess the data entity in its entirety, by a system that is verifying whether the former system does in fact possess the data entity in its entirety.

At 604, the first element corresponding to the first leaf is received.

At 606, a membership proof comprising a set of elements from one or more layers higher in the digital tree than the base layer of the digital tree is received, wherein the set of elements comprises a path from the first leaf to a root of the digital tree, wherein the set of elements is dependent on a plurality of additional leaves and wherein verification of the first element corresponding to the first leaf increases a level of confidence in an availability of the plurality of additional leaves. Along with the element, a membership proof of the requested element is also requested from the claiming system. In various embodiments, a "membership proof" for an element of a digital tree includes all the digital signatures in the digital tree along the path between that element and the root of the digital tree, which is the digital signature of the data entity. In some embodiments, the verifying/requesting system may separately obtain the digital signature of the data entity. In various embodiments, the requested element is authenticated/verified if and only if the digital signature of the data entity (the root of the digital signature tree) can be reproduced using the membership proof. Due to each layer of the digital tree being redundantly encoded and each layer of the digital tree being dependent upon (e.g., interleaved) elements from the layer that is immediately below in the digital tree, the verification of each element exponentially increases the confidence level that the claiming system has the remaining elements of the data entity (i.e., the remaining elements of the data entity are available at the claiming system). As such, if verifying/requesting system's verification threshold is a confidence level that is a high percentage but nevertheless less than 100%, it is possible to sample and verify fewer than all of the data elements of the data entity to reach the verification threshold.

Figure 7:
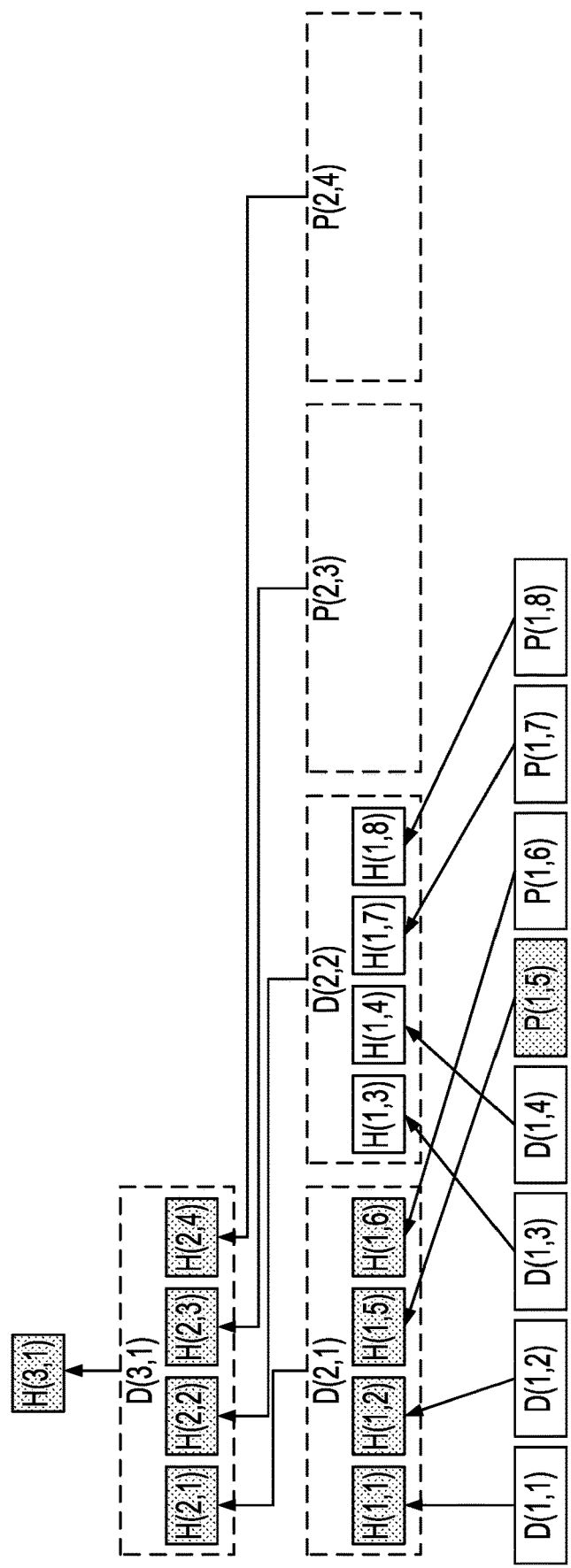
FIG. 7 demonstrates an example composition of a membership proof of a bottom/base layer coded symbol in accordance with some embodiments.

FIG. 7 demonstrates an example composition of a membership proof of a bottom/base layer coded symbol in accordance with some embodiments. The membership proof of a certain coded symbol includes all the digital signatures in the digital signature tree along the path between that coded symbol and the root of the digital signature tree, which is the digital signature of the data entity with which the digital signature tree is associated. For example, the membership proof of element P(1,5) consists of elements D(2,1) and D(3,1), which in turn include elements H(1,1), H(1,2), H(1,5), H(1,6), H(2,1), H(2,2), H(2,3), and H(2,4). This allows a party who has the digital signature of this data entity to authenticate the value of P(1,5) by repeatedly generating the associated digital signature computations. The coded symbol is authentic if and only if the digital signature of the data entity (the root of the digital signature tree) can be reproduced using the membership proof.

Various embodiments described herein allow a party who has the authentic digital signature of a data entity to verify, at a low cost, another party's claim of possessing the entire data entity. The approach is to randomly sample some data and parity symbols from each layer, and to reject the claim if the claiming party does not respond to any sampling requests with valid membership proofs. Due to redundancy coding, if the claiming party is missing any portion of the data entity, it will not be able to correctly reproduce the digital signature tree, and will indeed miss a large portion of the tree. The missing portion can be captured by the verifying party with exponentially increasing probability through random sampling.

For example, in a verification example, Alice may claim that she possesses a data entity (with which the digital signature tree that is shown in FIG. 7 is associated) in its entirety. In order to verify Alice's claim, Bob may request (sample) of Alice, element of P(1,5) and its corresponding membership proof of D(2,1) and D(3,1). Bob already has the authentic digital signature of the data entity, H(3,1), because it was made public. To verify element P(1,5), Bob may do the following:

A) Apply one-way function h( ) to P(1,5) to check whether the output matches H(1,5) (which is part of D(2,1)). If so, Bob proceeds to B.

B) Apply one-way function h( ) to D(2,1) to check whether the output matches H(2,1) (which is part of D(3,1)). If so, Bob proceeds to C.

C) Apply one-way function h( ) to D(3,1) to check whether the output matches H(3,1) (which is already known to Bob as the digital signature of the data entity). If so, Bob can verify that sampled code symbol P(1,5) is in fact part of the data entity.

Figure 8:
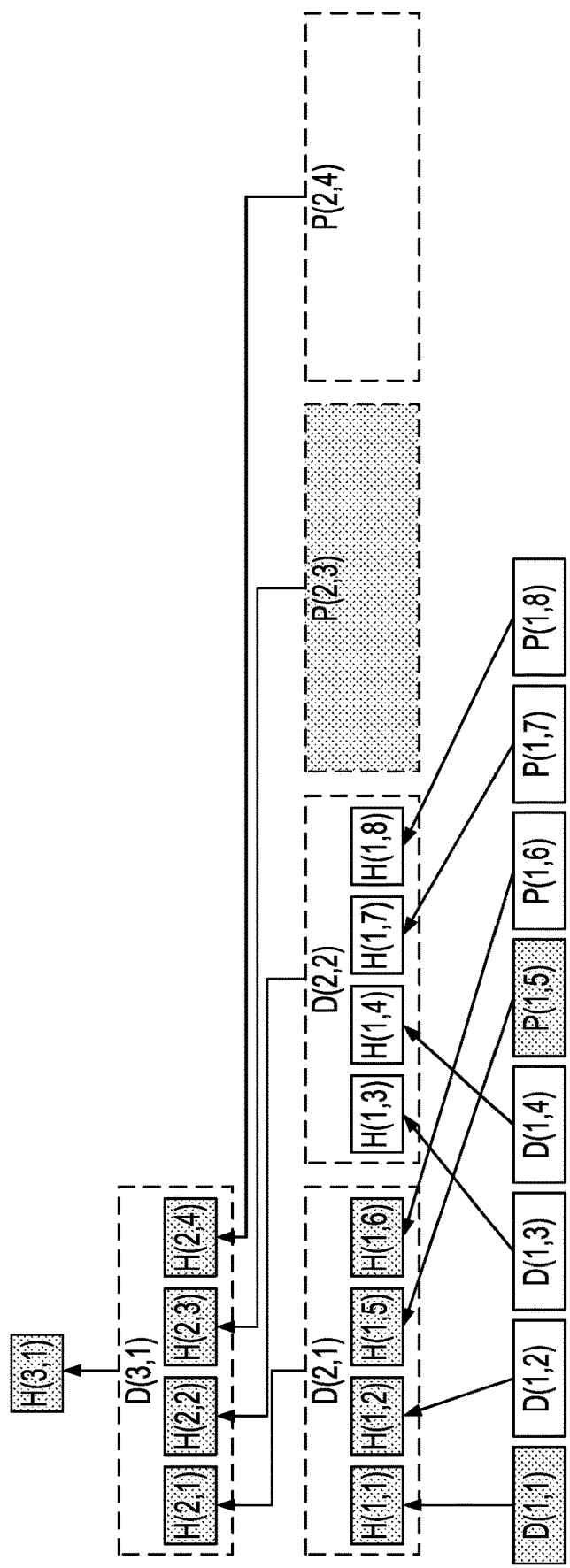
FIG. 8 demonstrates an example in which a membership proof of one base layer coded symbol can be used to further authenticate more coded symbols at different, higher layers of a digital signature tree in accordance with some embodiments.

FIG. 8 demonstrates an example in which a membership proof of one base layer coded symbol can be used to further authenticate more coded symbols at different, higher layers of a digital signature tree in accordance with some embodiments. For example, the same membership proof that corresponds to element P(1,5) can also be used to authenticate element D(1,1) from the bottom/base layer of the digital signature tree and element P(2,3) from the second layer of the digital signature tree. The reason that the same membership proof of element P(1,5) can also be used to authenticate elements D(1,1) and P(2,3) is because of the nature of batching interleaved digital signatures of data and parity elements in the same layer together to generate symbols in the next, higher layer in the digital tree. As shown in the example of FIG. 8, the digital signatures, H(1,5) and H(1,1), of P(1,5) and D(1,1), were both included in D(2,1). As shown in the example of FIG. 8, the digital signatures, H(2,1) and H(2,3), of D(2,1) and P(2,3), were both included in D(3,1). The authentication process of each of D(1,1) and P(2,3) is again reproducing the digital signature of the data entity, H(3,1). This extended membership proof helps save communication cost when authenticating multiple elements at different layers. Put another way, the extended membership proof enables the same membership proof to be used to verify multiple samples from a digital tree and may therefore obviate the need to transmit the same membership proof (e.g., over a network) to a verifying party if a previously sent one can be reused for a new sample/requested element.

Furthermore, given the redundancy encoding performed in each layer of the digital tree and the interleaving of digital signatures of data and parity elements in one layer in forming an element in the next, higher layer, the verification of each additional sampled coded element in the digital signature tree by a verifying party exponentially increases the confidence level that the claiming party does in fact have the desired data entity in its entirety. Whereas verification of a sampled element of a conventional signature tree (e.g., a Merkle) only authenticates that the sampled element is part of the data entity without significantly changing the verification confidence level of the remaining unsampled portions of the tree. According to various embodiments described herein, each additionally sampled and verified portion of the digital signature tree exponentially increases the confidence level that the claiming party has the remaining unsampled portions of the tree. The corresponding confidence level for different numbers of sampled and verified symbols in a digital signature tree that is generated as described herein is dependent on code rate r=k/n. If the sampling is uniformly at random, then the confidence level increases exponentially with the number of samples s as confidence=$1-(1-\alpha)^s$, where $\alpha$ is the minimum portion of the coded symbols needed to be hidden to prevent decoding, and a is upper bounded by 1−r. Provided that a verifying party may set a verification threshold of a data entity to be a high percentage confidence level that is, nevertheless, less than 100%, the verifying party can sample significantly less than all portions of the digital signature tree of a data entity from a claiming party in order to confirm, with the verification threshold level of confidence level, that the claiming party has the entire data entity. For example, if r=k/n=$\frac{4}{8}$=0.5 and where $\alpha$=0.3, after 5 samples have been verified, the confidence level that the claiming party has the entire data entity is $1-(1-0.3)^5$=83.2%. If the verification threshold confidence level were 80%, then the threshold would have been met after 5 verified samples and it would be verified that the claiming party has the entire data entity. Coupled with the fact that the same membership proof can be used to verify multiple symbols in a digital signature tree, in various embodiments, a verifying party that is remote to the claiming party can perform verification on different sampled symbols of the tree without needing to download a different membership proof for each sampled symbol.

Continuing the verification example described with FIG. 8 in which Alice claims that she possesses a data entity in its entirety and Bob needs to perform verification, after Bob verifies element P(1,5) using its corresponding membership proof of D(2,1) and D(3,1), Bob can continue to sample elements D(1,1) and P(2,3) from Alice and verify those samples using the same membership proof that he had previously received from Alice for element P(1,5), as described with FIG. 7 above. As such, Bob can more efficiently perform the additional verification of samples from Alice without needing to wait for additional membership proofs.

Figure 9:
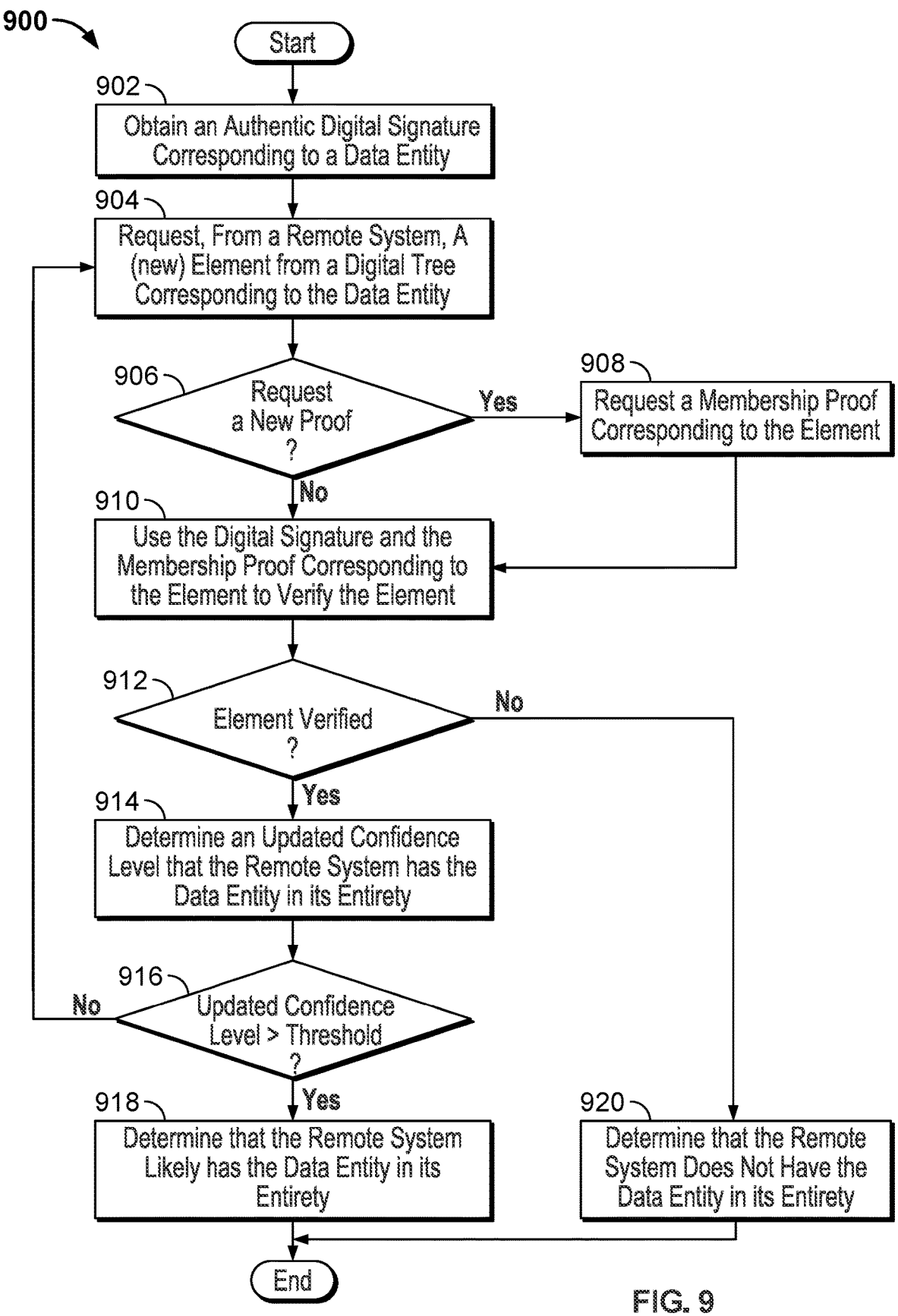
FIG. 9 is a flow diagram showing an example process of verifying a set of remotely stored data.

FIG. 9 is a flow diagram showing an example process of verifying a set of remotely stored data. In some embodiments, process 900 is implemented at system 102 or system 106 of FIG. 1.

At 902, an authentic digital signature corresponding to a data entity is obtained. In various embodiments, the digital signature corresponding to the data entity, which is also the root of the digital tree corresponding to the data entity, is publicly known. For example, the digital signature corresponding to the data entity is obtained from the remote, claiming system or another system that had a copy of the authentic digital signature.

At 904, a (new) element from a digital tree corresponding to the data entity is requested from a remote system. A portion/element of the digital tree is requested. For example, the element may be from the base layer or a non-base layer of the digital tree. The element may be a partition of the data entity, parity information that is generated from the data entity, a group of digital signatures, and/or parity information that is generated from one or more groups of digital signatures. In one example sampling strategy, s elements is sampled per layer uniformly at random, where the value of s depends on the a of each layer. The sequence/order (in terms of which layer to sample first, which element to sample first) does not matter.

At 906, whether a new membership proof needs to be requested is determined. In the event that a new membership proof needs to be requested, control is transferred to 908. Otherwise, in the event that a new membership proof does not need to be requested, control is transferred to 910. As mentioned above, in various embodiments, a membership proof corresponding to an element of a digital tree includes the elements in the digital tree along the path between that element and the root of the digital tree. As described above, due to the nature of batching (e.g., non-adjacent) elements in one layer of the digital tree to form elements in the next higher layer of the digital tree, a membership proof corresponding to one element may also include the membership proof corresponding to a different element in the digital tree. As shown in the examples of FIGS. 7 and 8, the same membership proof may be used to verify/authenticate more than one element in a digital tree. It is checked whether a membership proof corresponding to the element that was recently requested at step 904 is already included in a membership proof that was previously obtained/downloaded from the remote, claiming system.

At 908, a membership proof corresponding to the element is requested. If the relevant membership proof was not included in a previously obtained/downloaded membership proof, then it is requested from the remote system.

At 910, the digital signature and the membership proof corresponding to the element are used to verify the element. If the relevant membership proof is included in a previously obtained/downloaded membership proof, then the membership proof does not need to be redundantly requested and downloaded from the remote system.

At 912, whether the element can be verified is determined. In the event that the element can be verified, control is transferred to 914. Otherwise, in the event that the element cannot be verified, control is transferred to 920. One example technique of verifying a sampled element of the digital tree is to determine whether the digital signature corresponding to the sampled element can be found in the element of the membership proof that is in the layer that is immediately higher than that of the sampled element. If so, whether the digital signature of the element of the membership proof that is in the layer that is immediately higher than that of the sampled element can be found in the element of the membership proof that is in the layer that is two layers higher than that of the sampled element is determined, and so forth. This iterative process continues until the root/highest layer of the digital tree is reached. If the digital signature of the element of the membership proof in the layer just below the root/highest layer matches the authentic digital signature of the data entity, then the sampled element has been verified/authenticated.

At 914, an updated confidence level that the remote system has the data entity in its entirety is determined. With an additional sampled element having been verified, the confidence level that the remote system is in possession of the entire data entity increases exponentially according to at least some embodiments described herein. The updated confidence level is computed as a function of code rate r=k/n. For example, confidence=$1-(1-\alpha)^s$, where s is the number of samples that have been verified, where a is the minimum portion of the coded symbols needed to be hidden to prevent decoding, and a is upper bounded by 1−r.

At 916, whether the updated confidence level is greater than a verification confidence level threshold is determined. In the event that the updated confidence level is greater than the verification confidence level threshold, control is transferred to 918. Otherwise, in the event that the updated confidence level is equal to or less than the verification confidence level threshold, control is returned to 904. The verification confidence level threshold is configurable. For example, the verification confidence level threshold can be set to a high percentage that is less than 100%. Of course, the lower the verification confidence level threshold is, the fewer sampled elements that need to be verified in order to determine that the remote system has the entire data entity.

At 918, that the remote system likely has the data entity in its entirety is determined. Once the verification confidence level threshold is met, the remote system is determined to be in possession of the entire data entity.

At 920, that the remote system does not have the data entity in its entirety is determined. If any of the sampled elements cannot be verified, then it is determined that the remote system is not in possession of the entire data entity.

Various embodiments described herein also allow a party who possesses the authentic digital signature of a data entity to iteratively verify, starting from the root (highest) layer, whether the encoding at each layer is performed correctly. The redundancy coding is performed correctly if and only if every parity equation holds and every coded symbol matches its digital signature. Otherwise, the encoding is done incorrectly.

Figure 10:
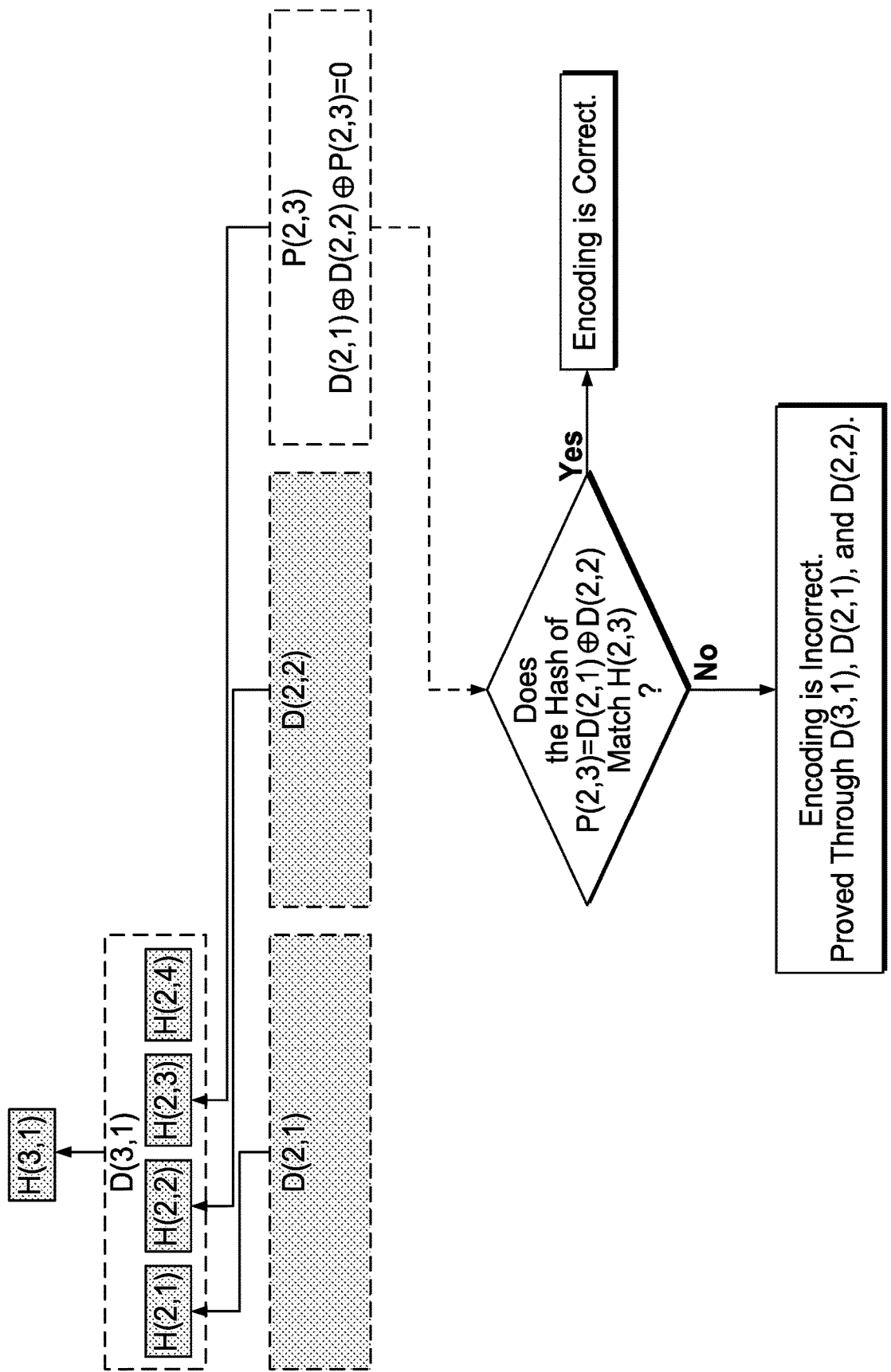
FIG. 10 is a diagram describing a first example check for whether the encoding of a sampled element of a digital tree has been performed correctly.

FIG. 10 is a diagram describing a first example check for whether the encoding of a sampled element of a digital tree has been performed correctly. For example, in FIG. 10, a party has downloaded element D(3,1) from another (e.g., claiming) party and has verified it using the public root H(3,1). It has also downloaded elements D(2,1) and D(2,2) and verified them using their digital signatures in H(3,1). Assume a parity equation of D(2,1) $\oplus$ D(2,2) $\oplus$ P(2,3)=0, then the party can compute element P(2,3) through P(2,3)= D(2,1) $\oplus$ D(2,2), and verify whether element P(2,3) matches its digital signature H(2,3) in element D(3,1) or not. If not, then the encoding is performed incorrectly. In this case, this party can generate an incorrect coding proof, which consists of D(3,1), D(2,1), and D(2,2). In various embodiments, in general, an "incorrect coding proof" provides that the encoding is done incorrectly by showing either 1) a set of elements with correct membership proof fails parity equation(s); or 2) a set of elements with correct memberships that decodes out elements(s) that do not match their membership proof. When an incorrect coding proof is generated, it is determined that the system/party that generated the digital signature corresponding to the data entity is engaging in fraudulent activity and that therefore, the data entity should be permanently rejected by parties who are aware of it even if the data entity is available.

Figure 11:
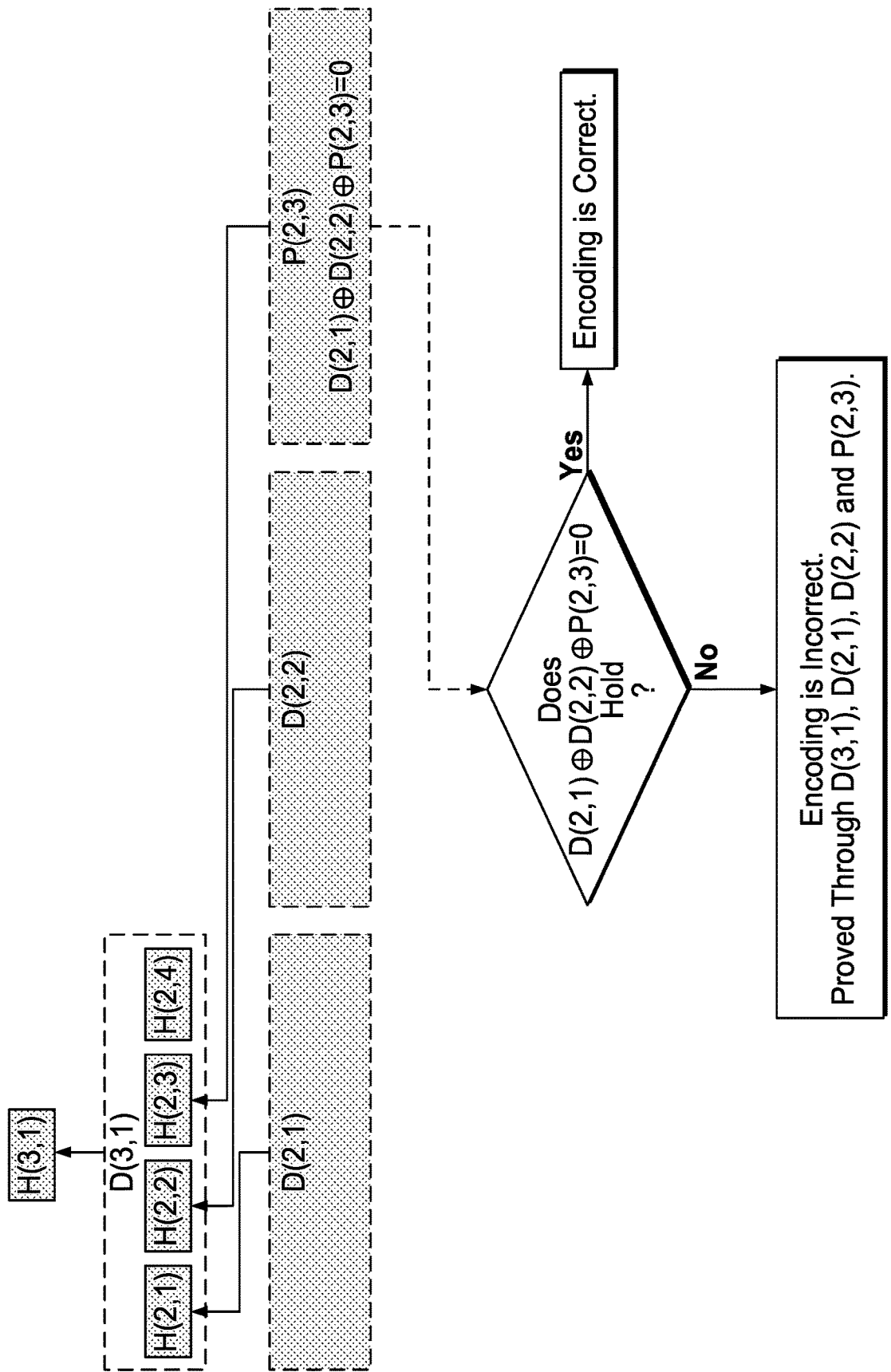
FIG. 11 is a diagram describing a second example check for whether the encoding of a sampled element of a digital tree has been performed correctly.

FIG. 11 is a diagram describing a second example check for whether the encoding of a sampled element of a digital tree has been performed correctly. For another example, in FIG. 11, a party has downloaded D(3,1) from another (e.g., claiming) party and has verified it using the public root H(3,1). It has also downloaded D(2,1), D(2,2), and P(2,3), and has verified them using their digital signatures in H(3,1). Assume D(2,1) $\oplus$ D(2,2) $\oplus$ P(2,3) must be equal to zero. If this parity equation does not hold, then the encoding is performed incorrectly. In this case, this party can generate an incorrect coding proof, which consists of D(3,1), D(2,1), D(2,2), and P(2,3).

Figure 12:
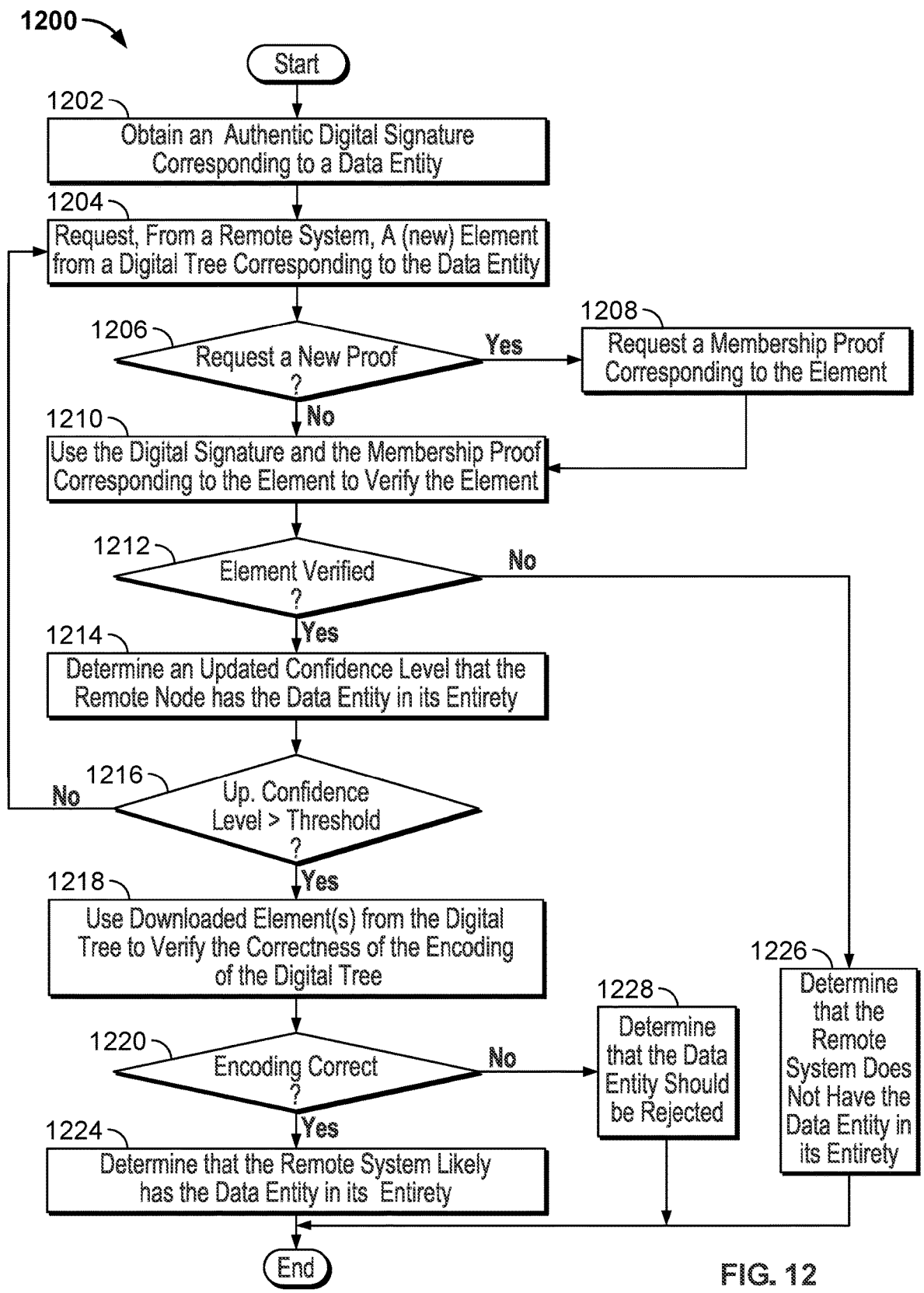
FIG. 12 is a flow diagram showing an example process of verifying and also checking for the correctness of the encoding of a set of remotely stored data.

FIG. 12 is a flow diagram showing an example process of verifying and also checking for the correctness of the encoding of a set of remotely stored data. In some embodiments, process 1200 is implemented at system 102 or system 106 of FIG. 1.

Process 1200 is similar to process 900 of FIG. 9 except that process 1200 additionally checks for whether the encoding of the remotely stored data entity is correct.

At 1202, an authentic digital signature corresponding to a data entity is obtained. Step 1202 may be performed similarly to step 902 of process 900 of FIG. 9.

At 1204, a (new) element from a digital tree corresponding to the data entity is requested from a remote system. Step 1204 may be performed similarly to step 904 of process 900 of FIG. 9.

At 1206, whether a new membership proof needs to be requested is determined. In the event that a new membership proof needs to be requested, control is transferred to 1208. Otherwise, in the event that a new membership proof does not need to be requested, control is transferred to 1210. Step 1206 may be performed similarly to step 906 of process 900 of FIG. 9.

At 1208, a membership proof corresponding to the element is requested. Step 1208 may be performed similarly to step 908 of process 900 of FIG. 9.

At 1210, the digital signature and the membership proof corresponding to the element are used to verify the element. Step 1210 may be performed similarly to step 910 of process 900 of FIG. 9.

At 1212, whether the element can be verified is determined. In the event that the element can be verified, control is transferred to 1214. Otherwise, in the event that the element cannot be verified, control is transferred to 1226. Step 1212 may be performed similarly to step 912 of process 900 of FIG. 9.

At 1214, an updated confidence level that the remote system has the data entity in its entirety is determined. With an additional sampled element having been verified, the confidence level that the remote system is in possession of the entire data entity increases exponentially according to at least some embodiments described herein. Step 1214 may be performed similarly to step 914 of process 900 of FIG. 9.

At 1216, whether the updated confidence level is greater than a verification confidence level threshold is determined. In the event that the updated confidence level is greater than the verification confidence level threshold, control is transferred to 1218. Otherwise, in the event that the updated confidence level is equal to or less than the verification confidence level threshold, control is returned to 1204. Step 1216 may be performed similarly to step 916 of process 900 of FIG. 9.

At 1218, downloaded element(s) from the digital tree are used to verify the correctness of the encoding of the digital tree. At least a subset of the elements of the digital tree that have been downloaded so far are used to determine whether the encoding was performed correctly in the digital tree. In various embodiments, parity equations that establish the relationship between data elements and their corresponding parity elements in each layer of the digital tree are known based on the redundancy code that was used to encode each layer of the digital tree or another known protocol. Various example techniques can be used to verify whether the downloaded elements comport with the known parity equations.

In the first encoding correctness determination example as described in FIG. 10, above, downloaded/sampled and verified data elements of the same layer can be used to compute not yet downloaded elements in this same layer based on the known parity equation(s). The digital signature(s) of computed element(s) can then be compared to the elements' digital signatures in a downloaded element in a higher layer of the digital tree. Only if the digital signature(s) of computed element(s) match those included in the downloaded element in the higher layer of the digital tree can the encoding of the digital tree be determined to be correct, so far. As such, in at least one example encoding verification technique, the downloaded elements of the digital tree in one layer can be used to verify whether the encoding is correctly performed for elements in a different layer, specifically, the layer below it in the digital tree.

In the second encoding correctness determination example as described in FIG. 11, above, the relationship among downloaded/sampled and verified data elements of the same layer can be compared to one described by a known parity equation. For example, a parity equation might indicate that each parity element in a layer is the result of the binary XOR of two data elements of the same layer. As such, whether the downloaded/sampled parity element is in fact the result of the binary XOR of two data elements of the same layer can be determined. Only if the downloaded elements' relationship(s) comport to that in a known parity equation can the encoding of the digital tree be determined to be correct, so far. As such, in at least one example encoding correctness determination technique, enough downloaded elements of the digital tree of the same layer can be used to verify whether the encoding is correctly performed in the digital tree.

At 1220, whether encoding was correctly performed in the digital tree is determined. In the event that the encoding was correctly performed, control is transferred to 1224. Otherwise, in the event that the encoding was not correctly performed, control is transferred to 1228.

At 1224, that the remote system likely has the data entity in its entirety is determined. Once the verification confidence level threshold is met and it is not determined that the encoding of the digital tree was determined to be incorrect, the remote system is determined to be in possession of the entire data entity.

At 1226, that the remote system does not have the data entity in its entirety is determined. If any of the sampled elements cannot be verified, then it is determined that the remote system is not in possession of the entire data entity.

At 1228, that the data entity should be rejected is determined. Due to the determined incorrectness in the encoding of the digital tree, fraudulent activity is suspected with respect to the generator of the digital signature of the data entity and also the claiming party, regardless of whether the claiming party has the data entity in its entirety or not. In some embodiments, the incorrect coding proof is also generated. For example, the incorrect coding proof includes at least the downloaded elements of the digital tree that did not comport with the known parity equations of the redundancy code.

As outlined in the example process of FIG. 12, a party who possesses the authentic digital signature (root) of a data entity can, for example, first verify the correctness of the encoding of the layer below the root, and fully decode this layer if the encoding is performed correctly. The decoding of this layer will recover the digital signatures of all the coded symbols of the next (lower) layer, which allows this party to verify the correctness of the encoding of this lower layer. The iteration continues until the base layer is full decoded, or until the party finds failed parity equation(s), in which case it can generate an incorrect coding proof that consists of all the involved coded symbols and their membership proofs.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a hardware processor configured to:
request a first element corresponding to a first leaf in a base layer of a digital tree, wherein the digital tree corresponds to a set of remotely stored data;
receive the first element corresponding to the first leaf; and
receive a membership proof comprising a set of elements from one or more layers higher in the digital tree than the base layer of the digital tree, wherein the set of elements comprises a path from the first leaf to a root of the digital tree, wherein the set of elements is dependent on a plurality of additional leaves and wherein verification of the first element corresponding to the first leaf increases a level of confidence in an availability of the plurality of additional leaves;
wherein each layer of the digital tree other than the root of the digital tree is encoded using a respective (N, K) redundancy code; and
wherein the respective (N, K) redundancy code is systematic such that a first K elements in a layer comprises data elements and (N–K) elements in the layer comprise parity elements, wherein N comprises a total number of elements in the layer; and
a memory coupled to the hardware processor and configured to provide the hardware processor with instructions.

2. The system of claim 1, wherein the hardware processor is further configured to obtain the root of the digital tree, wherein the root of the digital tree comprises a digital signature that corresponds to the set of remotely stored data.

3. The system of claim 2, wherein the hardware processor is further configured to verify the first element based at least in part on the set of elements and the digital signature that corresponds to the digital tree.

4. The system of claim 3, wherein to verify the first element based at least in part on the set of elements and the digital signature that corresponds to the digital tree comprises to determine that a first digital signature corresponding to the first element is included in a second element in the set of elements, wherein the second element is associated with a layer that is higher than the base layer of the digital tree.

5. The system of claim 3, wherein the hardware processor is further configured to:
   determine that the first element can be verified;
   determine an updated confidence level that a claiming system from which the first element was received has the set of remotely stored data in its entirety; and
   in response to a determination that the updated confidence level is greater than a verification threshold confidence level, determine that the claiming system likely has the set of remotely stored data in its entirety.

6. The system of claim 1, wherein the set of elements comprises a first set of elements, wherein the hardware processor is further configured to:
   obtain a second set of elements corresponding to a layer in the digital tree that is immediately above the base layer; and
   use the second set of elements to verify whether one or more elements corresponding to one or more leaves in the base layer of the digital tree are encoded correctly.

7. The system of claim 6, wherein the hardware processor is further configured to:
   determine that the one or more elements are not encoded correctly; and
   in response to the determination that the one or more elements are not encoded correctly, generate an incorrect coding proof that comprises at least the one or more elements.

8. The system of claim 1, wherein the hardware processor is further configured to:
   obtain at least one other element corresponding to one other leaf in the base layer of the digital tree; and
   use the first element, the at least one other element, and a parity equation to determine whether the first element and the at least one other element are encoded correctly.

9. The system of claim 8, wherein the hardware processor is further configured to:
   determine that the first element and the at least one other element are not encoded correctly; and
   in response to the determination that the first element and the at least one other element are not encoded correctly, generate an incorrect coding proof that comprises at least the first element and the at least one other element.

10. The system of claim 1, wherein a data element in a first layer in the digital tree comprises a group of digital signatures corresponding to one or more data elements and one or more parity elements in a second layer in the digital tree, wherein the second layer is lower than the first layer in the digital tree.

11. A method, comprising:
    requesting a first element corresponding to a first leaf in a base layer of a digital tree, wherein the digital tree corresponds to a set of remotely stored data;
    receiving the first element corresponding to the first leaf; and
    receiving a membership proof comprising a set of elements from one or more layers higher in the digital tree than the base layer of the digital tree, wherein the set of elements comprises a path from the first leaf to a root of the digital tree, wherein the set of elements is dependent on a plurality of additional leaves and wherein verification of the first element corresponding to the first leaf increases a level of confidence in an availability of the plurality of additional leaves;
    wherein each layer of the digital tree other than the root of the digital tree is encoded using a respective (N, K) redundancy code; and
    wherein the respective (N, K) redundancy code is systematic such that a first K elements in a layer comprises data elements and (N–K) elements in the layer comprise parity elements, wherein N comprises a total number of elements in the layer.

12. The method of claim 11, further comprising verifying the first element based at least in part on the set of elements and a digital signature that corresponds to the digital tree.

13. The method of claim 12, wherein verifying the first element based at least in part on the set of elements and the digital signature that corresponds to the digital tree comprises determining that a first digital signature corresponding to the first element is included in a second element in the set of elements, wherein the second element is associated with a layer that is higher than the base layer of the digital tree.

14. The method of claim 12, further comprising:
    determining that the first element can be verified;
    determining an updated confidence level that a claiming system from which the first element was received has the set of remotely stored data in its entirety; and
    in response to a determination that the updated confidence level is greater than a verification threshold confidence level, determining that the claiming system likely has the set of remotely stored data in its entirety.

15. The method of claim 11, wherein the set of elements comprises a first set of elements, and wherein the method further comprising:
    obtaining a second set of elements corresponding to a layer in the digital tree that is immediately above the base layer; and
    using the second set of elements to verify whether one or more elements corresponding to one or more leaves in the base layer of the digital tree are encoded correctly.

16. The method of claim 15, further comprising:
    determining that the one or more elements are not encoded correctly; and
    in response to the determination that the one or more elements are not encoded correctly, generating an incorrect coding proof that comprises at least the one or more elements.

17. The method of claim 11, further comprising:
    obtaining at least one other element corresponding to one other leaf in the base layer of the digital tree; and
    using the first element, the at least one other element, and a parity equation to determine whether the first element and the at least one other element are encoded correctly.

18. A computer program product, the computer program product being embodied in a non-transitory computer-readable storage medium and comprising computer instructions for:
    requesting a first element corresponding to a first leaf in a base layer of a digital tree, wherein the digital tree corresponds to a set of remotely stored data;
    receiving the first element corresponding to the first leaf; and
    receiving a membership proof comprising a set of elements from one or more layers higher in the digital tree than the base layer of the digital tree, wherein the set of elements comprises a path from the first leaf to a root of the digital tree, wherein the set of elements is dependent on a plurality of additional leaves and wherein verification of the first element corresponding to the first leaf increases a level of confidence in an availability of the plurality of additional leaves;

wherein each layer of the digital tree other than the root of the digital tree is encoded using a respective (N, K) redundancy code; and wherein the respective (N, K) redundancy code is systematic such that a first K elements in a layer comprises data elements and (N−K) elements in the layer comprise parity elements, wherein N comprises a total number of elements in the layer.

* * * * *